(12) United States Patent
Tsuchihashi et al.

(10) Patent No.: US 9,676,270 B2
(45) Date of Patent: Jun. 13, 2017

(54) WORK VEHICLE

(71) Applicant: Kubota Corporation, Osaka-shi (JP)

(72) Inventors: Hironori Tsuchihashi, Sakai (JP);
Hideya Umemoto, Sakai (JP); Osami Fujiwara, Sakai (JP); Yoshikazu Togoshi, Sakai (JP); Yoshikazu Takemoto, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/164,961

(22) Filed: May 26, 2016

(65) Prior Publication Data

US 2017/0087976 A1    Mar. 30, 2017

(30) Foreign Application Priority Data

Sep. 29, 2015    (JP) .................................. 2015-191907

(51) Int. Cl.
| | |
|---|---|
| *B60K 11/06* | (2006.01) |
| *B60K 11/04* | (2006.01) |
| *B60K 13/04* | (2006.01) |
| *B60K 13/02* | (2006.01) |
| *F02M 35/024* | (2006.01) |
| *F02M 35/04* | (2006.01) |
| *F01N 3/021* | (2006.01) |
| *A01D 34/64* | (2006.01) |

(52) U.S. Cl.
CPC .............. *B60K 11/04* (2013.01); *B60K 13/02* (2013.01); *B60K 13/04* (2013.01); *F01N 3/021* (2013.01); *F02M 35/02483* (2013.01); *F02M 35/048* (2013.01); *A01D 34/64* (2013.01)

(58) Field of Classification Search
CPC ........ B60K 11/08; B60K 11/085; B60K 11/04
USPC .............................. 180/68.1, 68.2, 68.3, 68.4
See application file for complete search history.

(56) References Cited

U.S. PATENT DOCUMENTS

| | | | | | |
|---|---|---|---|---|---|
| 1,257,219 | A | * | 2/1918 | Ihde ....................... | F01P 7/023 |
| | | | | | 123/41.04 |
| 1,660,145 | A | * | 2/1928 | Winans .................... | F01P 7/10 |
| | | | | | 165/41 |
| 1,660,146 | A | * | 2/1928 | Winans ................ | B60K 11/085 |
| | | | | | 165/11.1 |
| 4,093,119 | A | * | 6/1978 | Swisher ............. | B60H 1/00264 |
| | | | | | 180/68.2 |
| 4,523,657 | A | * | 6/1985 | Kooyumjian .......... | B60K 11/08 |
| | | | | | 160/DIG. 1 |
| 4,619,073 | A | * | 10/1986 | Janthur ............... | B29C 45/0081 |
| | | | | | 454/319 |

(Continued)

FOREIGN PATENT DOCUMENTS

| | | |
|---|---|---|
| JP | 2013209949 A | 10/2013 |
| JP | 5745449 B2 | 5/2015 |

*Primary Examiner* — Jeffrey J Restifo
(74) *Attorney, Agent, or Firm* — The Webb Law Firm (57) ABSTRACT

A work vehicle having a hood for covering an engine room is disclosed. The engine room has a first region and a second region partitioned from each other, the engine room being configured such that air can be introduced from outside of the hood to the first region. A radiator is disposed in the first region, and air flows through the radiator from the first region to the second region. In the second region, the engine and an accessory unit for the engine are provided. The work vehicle includes an adjusting device for adjusting an amount of the air that flows from the first region to the second region.

5 Claims, 7 Drawing Sheets

(56) References Cited

U.S. PATENT DOCUMENTS

| | | | | |
|---|---|---|---|---|
| 4,750,549 A * | 6/1988 | Ziegler | B60K 11/085 | 160/180 |
| 4,753,288 A * | 6/1988 | Harvey | B60K 11/085 | 123/41.04 |
| 5,267,624 A * | 12/1993 | Christensen | B60K 11/04 | 165/98 |
| 5,490,574 A * | 2/1996 | Ishiizumi | F01P 11/12 | 180/68.1 |
| 5,738,179 A * | 4/1998 | Matsui | B62D 25/10 | 16/357 |
| 6,131,681 A * | 10/2000 | Nelson | B60K 11/08 | 180/68.1 |
| 6,202,777 B1 * | 3/2001 | Surridge | B60K 11/08 | 180/68.1 |
| 8,505,660 B2 * | 8/2013 | Fenchak | B60K 11/085 | 180/68.1 |
| 8,517,130 B2 * | 8/2013 | Sakai | B60K 11/085 | 180/68.1 |
| 8,561,738 B2 * | 10/2013 | Charnesky | B60K 11/085 | 180/68.1 |
| 8,833,498 B2 * | 9/2014 | Charnesky | F01P 7/10 | 180/68.1 |
| 8,863,871 B2 * | 10/2014 | Kobayashi | B60L 11/1896 | 180/65.31 |
| 8,893,836 B2 * | 11/2014 | Asano | B60K 11/085 | 180/68.3 |
| 8,919,470 B2 * | 12/2014 | Hori | B60K 11/085 | 180/68.1 |
| 8,960,359 B2 * | 2/2015 | Nogami | B60K 11/06 | 180/296 |
| 9,033,082 B2 * | 5/2015 | Matsumoto | B60L 11/1896 | 180/68.2 |
| 2002/0017408 A1 * | 2/2002 | Oshikawa | B60K 11/08 | 180/69.2 |
| 2003/0066209 A1 * | 4/2003 | Takezaki | B60K 11/08 | 37/197 |
| 2004/0216934 A1 * | 11/2004 | Tomiyama | B60K 11/04 | 180/68.1 |
| 2006/0095178 A1 * | 5/2006 | Guilfoyle | B60K 11/085 | 701/36 |
| 2006/0102399 A1 * | 5/2006 | Guilfoyle | B60K 11/04 | 180/68.1 |
| 2010/0083917 A1 * | 4/2010 | Saida | B60K 11/085 | 123/41.04 |
| 2010/0126440 A1 * | 5/2010 | Hokimoto | B60K 11/04 | 123/41.49 |
| 2010/0147613 A1 * | 6/2010 | Jansen | B62D 25/10 | 180/69.2 |
| 2010/0229842 A1 * | 9/2010 | Pettersson | B60K 11/04 | 123/568.12 |
| 2010/0282533 A1 * | 11/2010 | Sugiyama | B60K 11/085 | 180/68.1 |
| 2011/0097984 A1 * | 4/2011 | Hasegawa | B60K 11/085 | 454/152 |
| 2012/0073767 A1 * | 3/2012 | Graziano | B60J 11/06 | 160/368.1 |
| 2012/0091757 A1 * | 4/2012 | Tregnago | B60K 11/085 | 296/193.1 |
| 2012/0132474 A1 * | 5/2012 | Charnesky | B60K 11/085 | 180/68.1 |
| 2013/0256054 A1 * | 10/2013 | Nogami | B60K 11/06 | 180/309 |
| 2014/0151139 A1 * | 6/2014 | Rizzon | B60K 11/08 | 180/68.1 |
| 2014/0284123 A1 * | 9/2014 | Bourqui | B60K 11/085 | 180/68.1 |
| 2016/0040634 A1 * | 2/2016 | Haight | B01D 46/0083 | 95/26 |
| 2016/0176450 A1 * | 6/2016 | Wolf | B62D 35/00 | 180/68.2 |

* cited by examiner

WORK VEHICLE

CROSS-REFERENCE TO RELATED APPLICATION

This application claims priority to Japanese Patent Application No. 2015-191907 filed Sep. 29, 2015, the disclosure of which is hereby incorporated in its entirety by reference.

BACKGROUND OF THE INVENTION

1. Field of the Invention

The present invention relates to a work vehicle having a hood for covering an engine room.

2. Description of Related Art

With a conventional work vehicle, in an engine room, there are provided a first region capable of introducing air from the outside of a hood and a second region partitioned from the first region (see e.g. JP 5745449 B2 (JP 2013-209949 A) or U.S. Pat. No. 8,960,359 B2 (US 2013/0256054 A1) corresponding thereto).

In such a work vehicle, a radiator is provided in the first region, and an engine and a non-radiator engine accessory unit (i.e. engine accessory unit other than a radiator) are provided in the second region. And, an arrangement is made such that air through the radiator flows from the first region to the second region.

Incidentally, in a place having a low ambient temperature such as a cold district, if an amount of ambient air flowing through the second region of the engine room is too large, this results in over-cooling of the engine and the engine accessory unit, so that a malfunction may occur. On the other hand, in a place where the ambient temperature is not so low, if the amount of ambient air flowing through the second region of the engine room is too small, this may result in overheating of the engine.

In view of the above-described state of the art, there is a need for a work vehicle capable of maintaining an engine and an engine accessory unit at an appropriate temperature.

SUMMARY OF THE INVENTION

According to a primary aspect of the present invention, a work vehicle comprises:

a hood that covers an engine room, the engine room having a first region and a second region partitioned from each other, the engine room being configured such that air can be introduced from outside of the hood to the first region;

a radiator disposed in the first region, air flowing through the radiator from the first region to the second region;

an engine disposed in the second region;

an accessory unit for the engine provided in the second region; and an adjusting device for adjusting an amount of the air that flows from the first region to the second region.

According to the above aspect, with the adjusting device, it is possible to adjust an amount of air flowing into the second region in which the engine and a non-radiator engine accessory unit are provided. With this, for instance, in a place having a low ambient temperature such as a cold district, if the amount of ambient air to flow into the second region is reduced by the adjusting device, it is possible to avoid excessive cooling of the engine and the engine accessory unit, etc. by the ambient air, so that malfunction of the engine and the engine accessory unit, etc. will occur less likely. On the other hand, in a place where the ambient temperature is not so low, if the amount of ambient air flowing through the second region of the engine is increased by the adjusting device, the engine can be cooled sufficiently, so it is possible to avoid overheating of the engine.

In this way, through adjustment of an amount of air flowing into the second region in accordance with an ambient temperature, the engine and the engine accessory unit, etc. can be maintained at an appropriate temperature in an effective manner.

Incidentally, in the above, it is understood that adjustment of air by the adjusting device includes complete shutout of air to flow into the second region.

According to one preferred embodiment, the work vehicle further comprises:

a fan for generating air current that flows from the first region toward the second region;

wherein the adjusting device includes a shutter mechanism for varying an amount of the air flowing from the first region to the second region by drive of the fan.

With this arrangement, by increasing an opening degree of the shutter mechanism, it is possible to increase an amount of the air flowing from the first region to the second region. On the other hand, by decreasing the opening degree of the shutter mechanism, it is possible to decrease the amount of the air flowing from the first region to the second region. And, as this shutter mechanism can be disposed inside the hood in a compact manner, the adjustment of air amount flowing into the second region can be realized without impairing outer appearance of the hood.

Incidentally, it is understood that the adjustment of air amount by the shutter mechanism includes a case of the opening degree of the shutter mechanism being zero.

According to one preferred embodiment, the hood includes a ventilation portion at a portion thereof corresponding to the first region, the ventilation portion being configured to prevent introduction of dust into the hood from the outside thereof and to allow communication of air between the outside of the hood and the first region; and the adjusting device includes a cover mechanism configured to cover the portion of the hood corresponding to the first region and to vary an aperture ratio of the ventilation portion.

With this arrangement, by increasing the aperture ratio of the ventilation portion by the cover mechanism, the amount of air flowing into the first region from the outside is increased, so that the amount of air flowing from the first region to the second region can be increased. On the other hand, by decreasing the aperture ratio of the ventilation portion by the cover mechanism, the amount of air flowing into the first region from the outside is decreased, so that the amount of air flowing from the first region to the second region can be decreased. As such cover mechanism can be of a relatively simple construction, the adjustment of the air amount flowing into the second region can be realized, with suppression of increase of manufacture cost.

Incidentally, it is understood that the adjustment of air amount by the cover mechanism includes a case of the aperture ratio of the ventilation portion being zero.

According to one preferred embodiment, the work vehicle further comprises:

an air duct member disposed upwardly of the radiator and forming an air duct allowing air flow therethrough;

wherein the accessory unit includes an air cleaner configured to feed dust-removed air to the engine, an intake opening of the air cleaner being disposed on a downstream side end of air flowing through the air duct.

With this arrangement, in the periphery of the radiator in which cooling water having removed heat from the engine circulates, a relatively high temperature is present. And, by disposing an air duct member upwardly of such radiator, it is possible to humidify the air in the air duct formed by the air duct member. And, as the intake opening of the air cleaner is disposed on the downstream side end of air flowing through the air duct, air humidified by the radiator will be fed to the intake opening of the air cleaner. Thus, introduction of excessively cooled air to the engine is avoided, so that malfunction of the engine will occur less likely.

According to one preferred embodiment, the accessory unit includes an exhaust gas treating device for effecting a cleaning treatment on exhaust gas from the engine.

With this arrangement, an appropriate temperature can be maintained in the periphery of the exhaust gas treating device. For instance, if a DPF (diesel particulate filter) unit is provided as the exhaust gas treating device, if the temperature around this DPF unit is too low, a malfunction can occur in the course of a regeneration treatment in which filtering function is regenerated through combustion of filtered-out dust. As the amount of air flowing into the second region can be appropriately adjusted by the adjusting mechanism, the possibility of occurrence of such malfunction can be avoided effectively.

Other features and advantages resulting therefrom will become apparent upon reading the following description with reference to the accompanying drawings.

DESCRIPTION OF THE PREFERRED EMBODIMENTS

General Configuration

Next, with reference to FIGS. 1-8, one embodiment of the present invention will be explained. In this embodiment, a front-mount mower (a riding type grass mower) is disclosed as an example of work vehicle.

Figure 1:
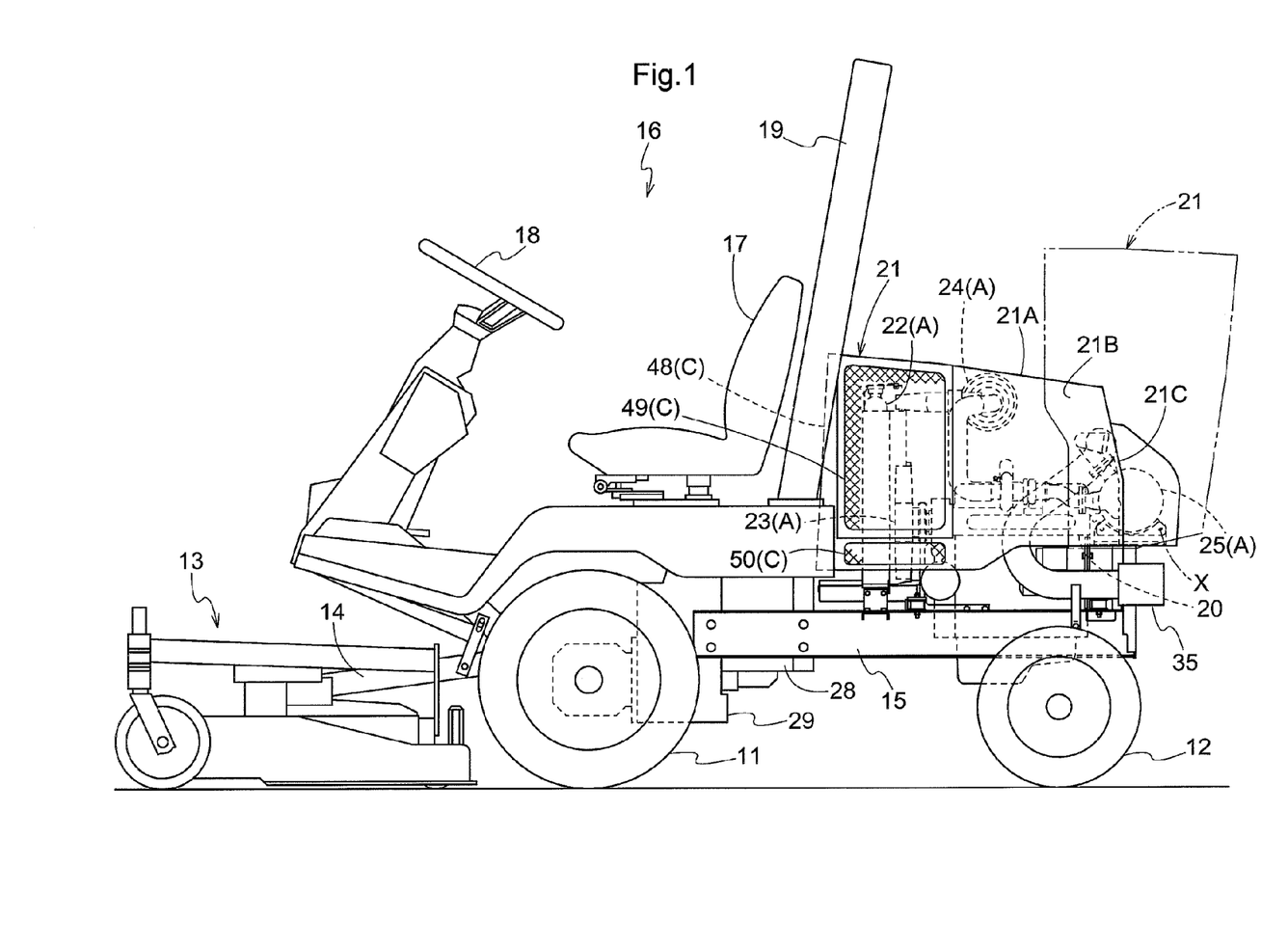
FIG. 1 is a side view showing a front-mount mower as a whole.

As shown in FIG. 1, a traveling vehicle body of the front-mount mower includes a vehicle body frame 15 supported by a pair of right and left front wheels 11 which are fixed in steering orientation, and a pair of right and left steerable rear wheels 12. At a portion forwardly of the front wheels 11 in the traveling vehicle body, a bar-blade type mower unit 13 is suspended by the vehicle body frame 15 to be lifted up/down relative thereto via a hydraulically driven lift mechanism 14.

At a front/rear center portion of the traveling vehicle body, there is provided a driving section 16 where a driving operation is effected. The driving section 16 includes a driver's seat 17 at which an operator can be seated, a steering wheel 18 for steering the rear wheels 12, a portal-shaped ROPS (roll-over protection) frame 19 for protecting a riding space of the operator seated at the driver's seat 17, and so on.

Figure 2:
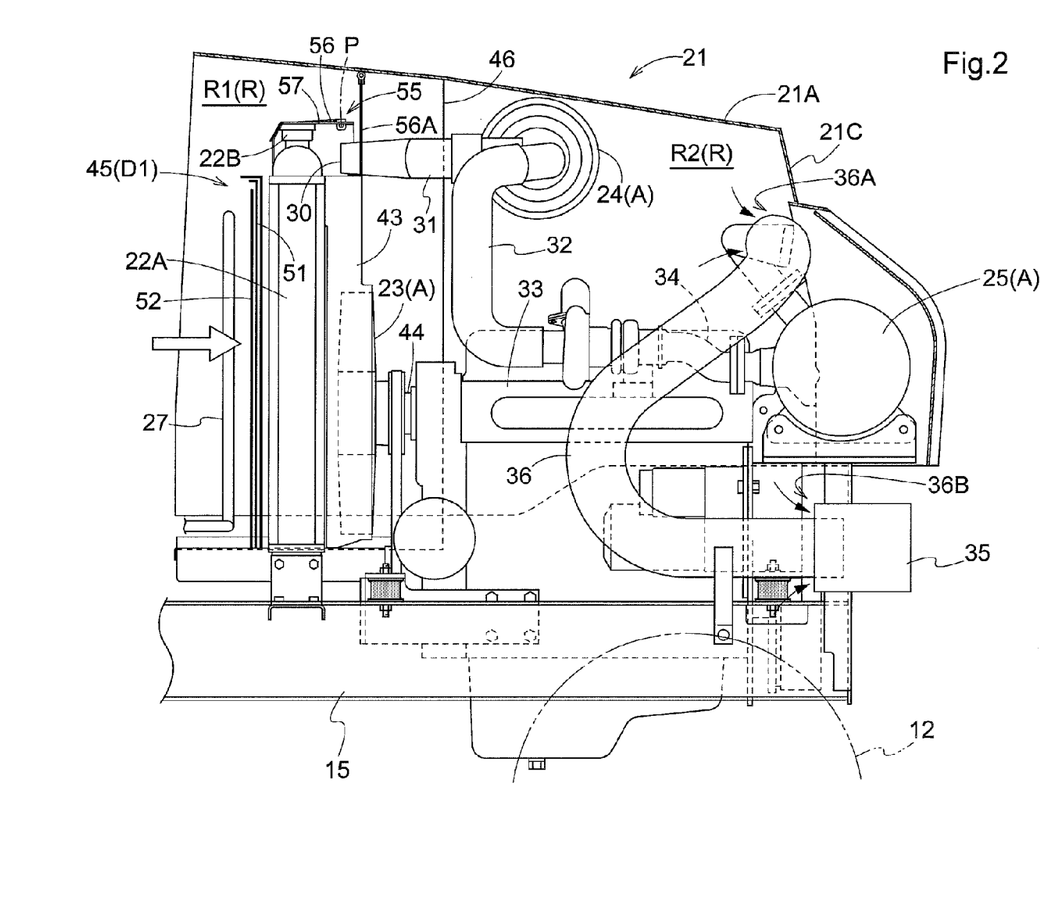
FIG. 2 is a side view in partial section showing periphery of an engine room.
Figure 3:
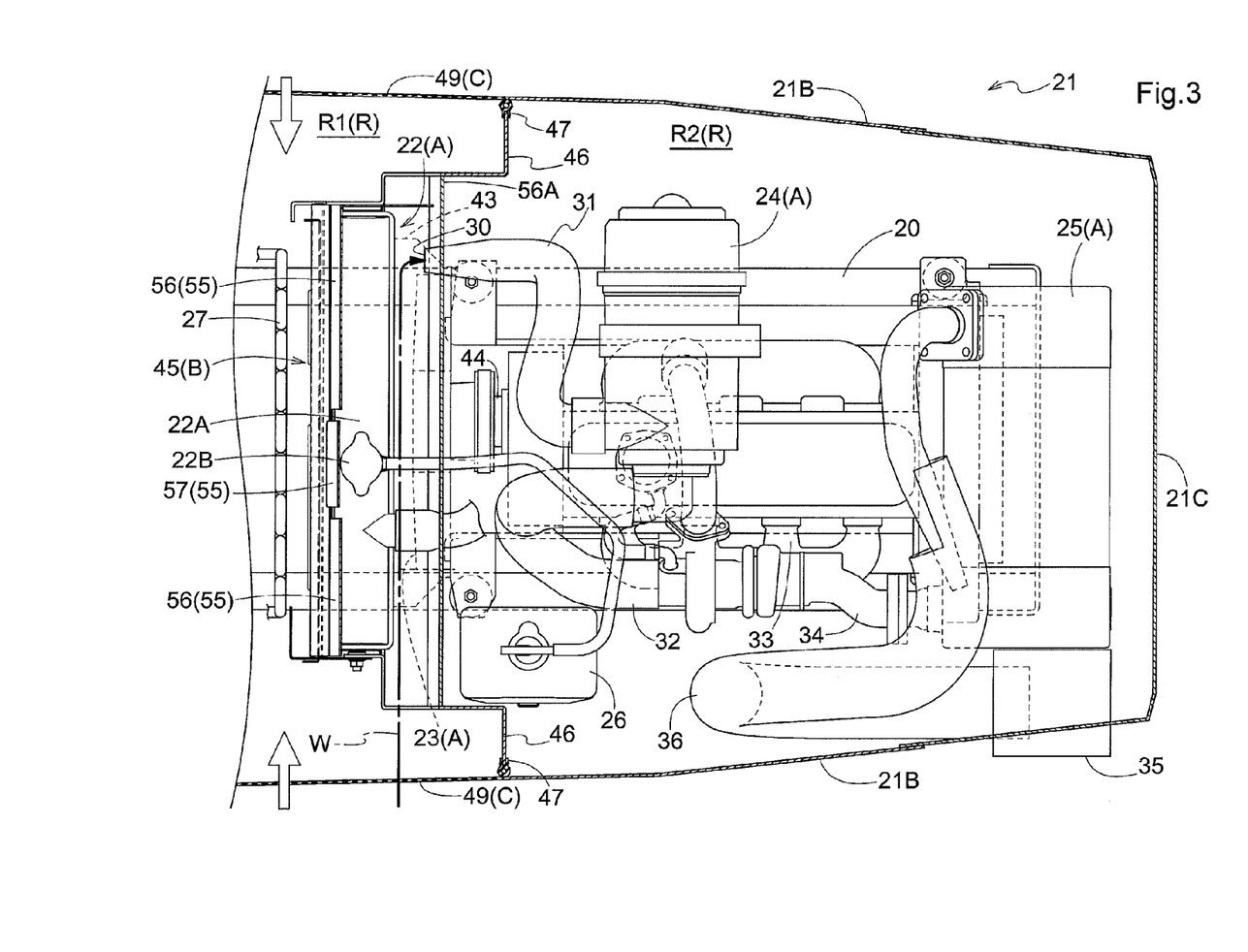
FIG. 3 is a plan view in partial section showing periphery of the engine room.
Figure 4:
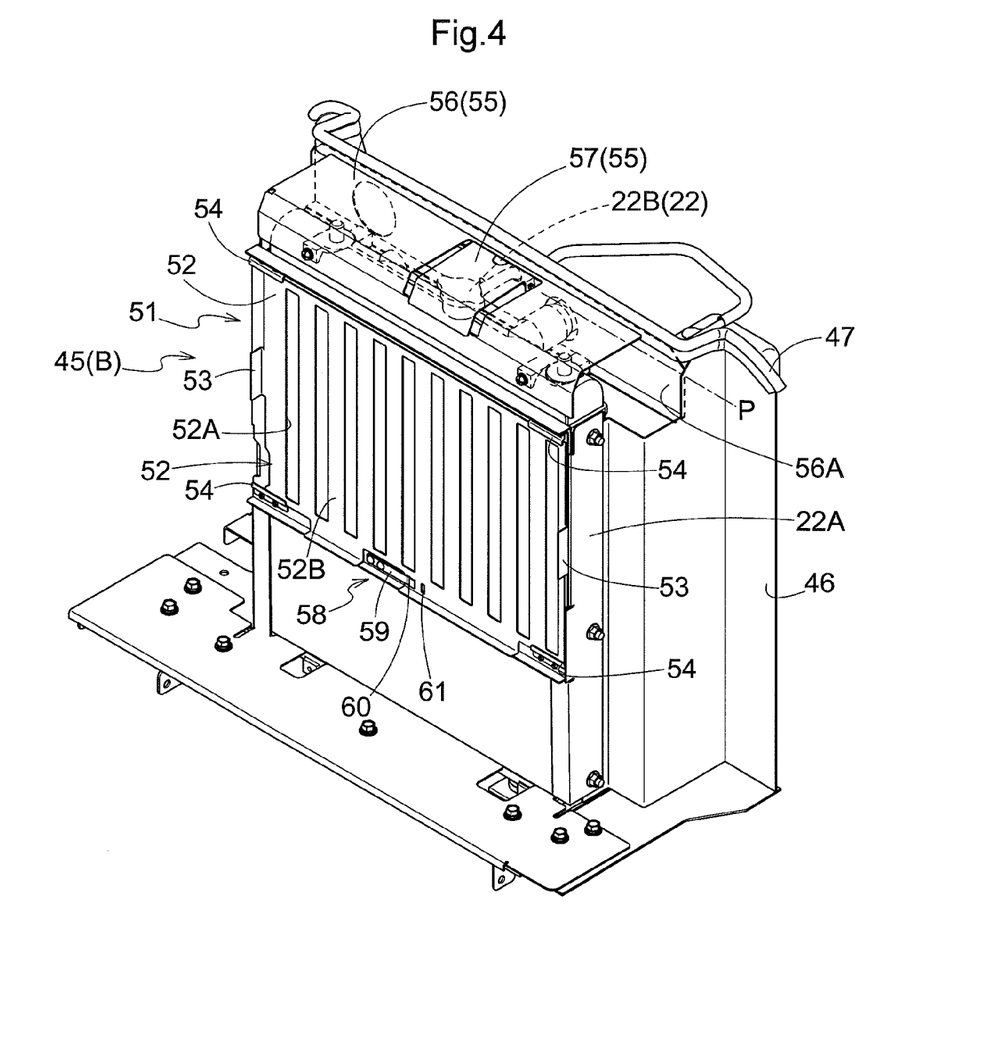
FIG. 4 is a perspective view showing periphery of a radiator.

As shown in FIGS. 1-3, at a rear portion of the traveling vehicle body, there is provided a hood 21 for covering an engine room R accommodating an engine 20 constituted of a water-cooled diesel engine, etc.

As shown in FIG. 1, the hood 21 consists of a top plate portion 21A and right and left side plate portions 21B formed integral with each other, and an enclosure member 21C disposed rearwardly of the top plate portion 21A and the right and left side plate portions 21B. The enclosure member 21C includes an upper face, a pair of right and left side faces and a rear face. Further, the top plate portion 21A and the right and left side plate portions 21B are configured to be vertically pivotable about an axis X at a rear portion in a vehicle body width direction, between a closed posture for covering the engine room R and an opened posture opening up the upper side of the engine room R.

In the engine room R inside the hood 21 under its closed posture, accessory units A of the engine 20 are accommodated in addition to this engine 20. As an example of the accessory units A, a radiator 22 for water-cooling the engine 20 is provided. As other examples of the accessory units A other than the radiator 22, there are provided a fan 23 for introducing ambient air into the engine room R by generating air current, a cylindrical air cleaner 24 for feeding dust-removed air to the engine 20, and a diesel micro particle collection filter (diesel particulate filter) 26 (to be referred to briefly as "DPF 25" hereinafter; an example of exhaust gas treating device) for effecting cleaning treatment on exhaust gas from the engine 20. The radiator 22 includes a core portion 22A in which air can flow and cooling water can circulate, and a cap 22B. Adjacent the radiator 22, there is disposed a reserve tank 26 capable of reserving an amount of cooling water which flows in the radiator 22. Further, forwardly of the radiator 22, there is provided an oil cooler 27 for cooling a work oil that flows through e.g. a hydraulic stepless speed changer device 28 (referred to as "HST 28" hereinafter) disposed at a vehicle body front portion.

As shown in FIG. 2 and FIG. 3, inside the hood 21, from the front side in the vehicle body front/rear direction, there are disposed the radiator 22, the fan 23, the engine 20 and the DPF 25 in this mentioned order. The engine 20 is mounted under a so-called vertical mount arrangement with a crank shaft thereof extending along the vehicle body front/rear direction.

Power taken off to the front side from the engine 20 is transmitted to the HST 28 to be subjected to a stepless speed-change operation thereby and then inputted to a transmission case 29 directly coupled to the HST 28. Then, the power is subjected to a gear speed reduction in this transmission case 29 and transmitted as such to the front wheels 11. Further, traveling power taken off to the rear side inside the transmission case 29 is transmitted to the rear wheels 12 via a transmission shaft.

Further, a portion of the power of the engine 20 inputted to the HST 28 is transmitted directly, i.e. without any speed change, to a PTO line inside the transmission case 29. Then, this power transmitted to the PTO transmission line is subjected to a gear speed reduction, if necessary, and transmitted to a PTO shaft protruding from a rear portion of the transmission case 29. The power transmitted to the PTO shaft is transmitted via a transmission shaft to the mower unit 13.

Engine Room

As shown in FIG. 2 and FIG. 3, in the engine room R, there are provided a first region R1 capable of introducing air from the outside of the hood 21 and a second region R2 partitioned from the first region R1. In the first region R1, the radiator 22 is provided. In the second region R2, the engine 20 and the non-radiator accessory units A of the engine 20 other than the radiator 22 are provided. Namely, in this second region R2, the fan 23, the engine 20, the air cleaner 24 and the DPF 25 are provided.

As shown in FIG. 2, the air cleaner 24 is disposed, upwardly of the engine 20, with a lateral offset from the center portion in the vehicle body transverse direction. The air cleaner 24 is disposed with its direction of cylindrical axis oriented along the vehicle body right/left direction. To this air cleaner 24, an intake pipe 31 having an intake opening 30 is connected. Further, to this air cleaner 24, there is also connected a feed pipe 32 for feeding air dust-removed by the air cleaner 24 to the engine 20 side.

As shown in FIG. 2 and FIG. 3, to the DPF 25, there is connected an inlet pipe 34 connected to an exhaust manifold 33 of the engine 20. Further, to this DPF 25, there is also connected an exhaust pipe 36 having an exhaust opening 35. At mid positions of the exhaust pipe 36, there are provided a first ejector portion 36A and a second ejector portion 36 disposed on more exhaust downstream side of the exhaust pipe 36 than the first ejector portion 36A. The first ejector portion 36A and the second ejector portion 36B respectively are configured, with the ejector function thereof, to introduce air present around the connecting portion of the exhaust pipe 36 into this exhaust pipe 36, thereby to lower the temperature of exhaust gas to be discharged from the exhaust opening 35.

The radiator 22 and the fan 23 are connected to each other via a shroud 43 having an opening portion adjacent its front/rear, right/left center portion. The first region R1 and the second region R2 are partitioned from each other as the shroud 43 acts as a partitioning wall therebetween along the vehicle body transverse direction. Through the opening formed in the shroud 43, air communication is made possible between the first region R1 and the second region R2.

The fan 23 is configured to input power from an output shaft 44 of the engine 20. With driving of this fan 23, air is caused to flow through the radiator 22 from the first region R1 to the second region R2. Namely, the fan 23 is configured to generate air current which flows from the first region R1 toward the second region R2. More particularly, in association with driven rotation of the fan 23, ambient air introduced from the front side of the hood 21 is caused to pass the radiator 22 and this ambient air is fed to the rear side.

As shown in FIG. 3 and FIGS. 5-8, in the first region R1, there is provided a shutter mechanism 45 as an example of an adjusting device B capable of adjusting an amount of air introduced from the first region R1 into the second region R2.

As shown in FIG. 3, laterally of the shroud 43, there are provided right and left partitioning plates 46. The lateral outer sides of the right and left partitioning plates 46 are shaped along the inner wall of the hood 21. Between the right and left partitioning plates 46 and the inner wall of the hood 21, there is interposed a rubber seal member 47. With this, the first region R1 and the second region R2 are partitioned from each other.

As shown in FIG. 1, at a portion of the hood 21 corresponding to the first region R1, there is provided a ventilation portion C configured to inhibit intrusion of dust from the outside of the hood 21 to the inside thereof and also to allow flow of air between the outside of the hood 21 and the first region R1.

More specifically, as the ventilation portion C, there are provided a front ventilation portion 48, right and left upper lateral ventilation portions 49 formed on the right and left sides of the front portion of the hood 21, and right and left lower lateral ventilation portions 50 formed on the right and left sides of the front side of the hood 21 and disposed downwardly of the upper lateral ventilation portions 49. The front ventilation portion 48, the upper lateral ventilation portions 49 and the lower lateral ventilation portions 50, respectively are formed of mesh-like member. Further, the front ventilation portion 48, the upper lateral ventilation portions 49 and the lower lateral ventilation portions 50, respectively are formed at portions of the hood 21 which correspond to the first region R1 of the engine room R.

Shutter Mechanism

As shown in FIGS. 3-8, an arrangement is provided to allow change of an amount of air which flows into the first region R1 and then flows from this flow region R1 toward the second region R2. Into the first region R1, in association with driven rotation of the fan 23, ambient air is caused to flow through the front ventilation portion 48, the upper lateral ventilation portions 49 and the lower lateral ventilation portions 50. A shutter mechanism 45 is disposed between the oil cooler 27 and the core portion 22A of the radiator 22.

As shown in FIGS. 4-8, the shutter mechanism 45 includes a fixed grating-like member 51 (fixed part) and a movable grating-like member 52 (movable part) that is movable relative to the fixed grating-like member 51. The movable grating-like member 52 is configured to be slidable in the right/left direction relative to the fixed grating-like member 51. The fixed grating-like member 51 is disposed between the movable grating-like member 52 and the core portion 22A of the radiator 22.

The fixed grating-like member 51 includes a plurality of vertically elongate first ventilation holes 51A provided in plurality in right and left juxtaposition for allowing air flow and first blocking portions 51B formed adjacent the first ventilation holes 51A for blocking air flow. The movable grating-like member 52 includes a plurality of vertically elongate second ventilation holes 52A provided in plurality in right and left juxtaposition for allowing air flow and second blocking portions 52B formed adjacent the second ventilation holes 52A for blocking air flow. The size of the first ventilation holes 51A is made approximately equal to the size of the second ventilation holes 52A.

At the right and left end portions of the front side of the movable grating-like member 52, there are provided handles 53 which are manually operable.

Figure 5:
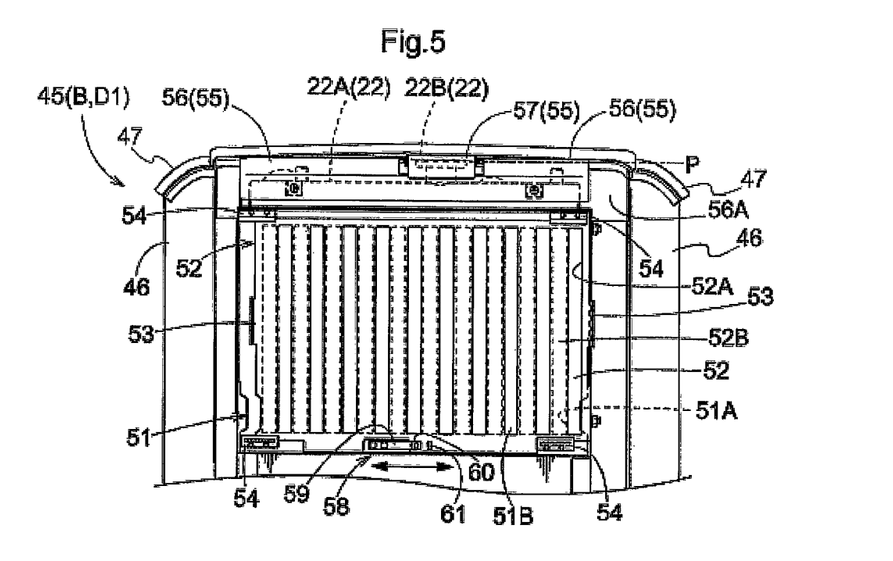
FIG. 5 is a front view showing periphery of a shutter mechanism in case a shutter mechanism as an adjusting device is under a closed state.
Figure 6:
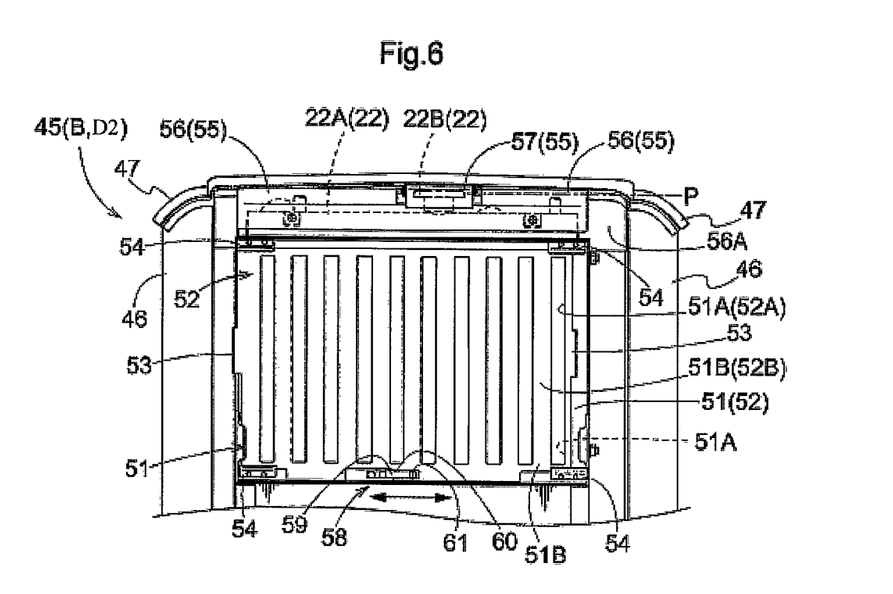
FIG. 6 is a front view showing periphery of the shutter mechanism in case the shutter mechanism as the adjusting device is under an opened state.
Figure 7:
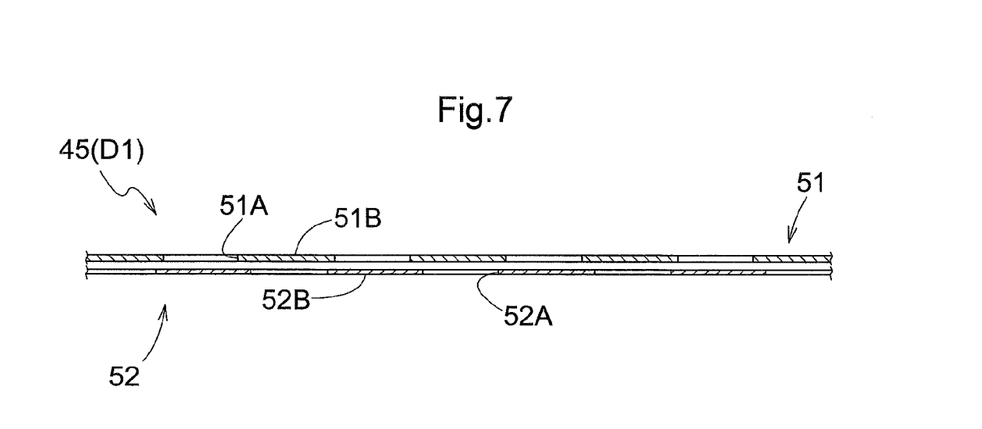
FIG. 7 is a plan view in section showing periphery of the shutter mechanism in case the shutter mechanism as the adjusting device is under the opened state.
Figure 8:
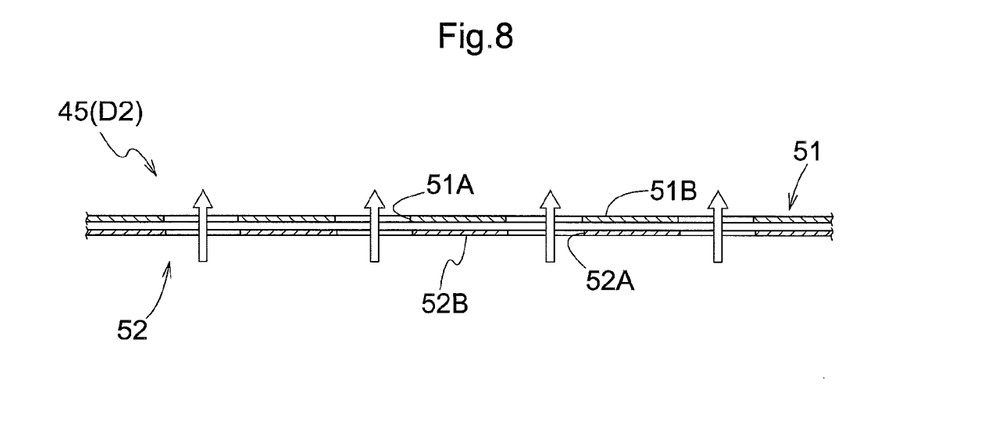
FIG. 8 is a plan view in section showing periphery of the shutter mechanism in case the shutter mechanism as the adjusting device is under the closed state.

The shutter mechanism 45 can be switched over between a closed state D1 preventing air flow into the engine room R through the shutter mechanism 45 as illustrated in FIG. 5 and FIG. 7; and an opened state D2 allowing air flow into the engine room R through the shutter mechanism 45 as illustrated in FIG. 6 and FIG. 8.

As shown in FIG. 5 and FIG. 7, when the shutter mechanism 45 is rendered into the closed posture D1 not allowing air flow, the second ventilation holes 52A are blocked by the plate portions of the fixed grating-like member 51 and also the first ventilation holes 51A are blocked by the plate portion of the movable grating-like member 52. With this, there is realized a state wherein no air flows from the shutter mechanism 45 to the core portion 22A of the radiator 22.

On the other hand, as shown in FIG. 6 and FIG. 8, when the shutter mechanism 45 is rendered into the opened posture D2 allowing air flow, the first ventilation holes 51A and the second ventilation holes 52A are in overlapped registration with each other, thus allowing air flow from the shutter mechanism 45 to the core portion 22A of the radiator 22.

Further, as shown in FIG. 5 and FIG. 6, the shutter mechanism 45 includes a positioning mechanism 58 capable of retaining the fixed grating-like member 51 and the movable grating-like member 52 under the closed state D1 and the opened state D2, respectively. The positioning mechanism 58 includes a retaining piece 59 in the form of a plate spring fixed to the fixed grating-like member 51, a first hole portion 60 and a second hole portion 61 adjacent the first hole portion 60. As shown in FIG. 5, when the retaining piece 59 comes into engagement with the first hole portion 60, the shutter mechanism 45 is position-fixed under the closed state D1. On the other hand, when the retaining piece 59 comes into engagement with the second hole portion 61, the shutter mechanism 45 is position-fixed under the opened state D2.

Air Duct Member

As shown in FIGS. 2-6, upwardly of the radiator 22, there is provided an air duct member 55 forming an air duct W allowing air flow therethrough. The air duct member 55 includes a main body member 56 having a reverse L-shape as seen in a side view, a flap member 57 openable and closable relative to the main body member 56, and a rear partitioning wall 56A having an L-shape as seen in a side view, as being disposed rearwardly of the main body member 56. The space surrounded by the main body member 56, the flap member 57 and the rear partitioning wall 56A constitutes the air duct W. The flap member 57 when assuming a closed posture covers a cap 22B of the radiator 22. Though not shown in details, the flap member 57 is pivotable about a lateral axis P. So that, when this flap member 57 is opened, the cap 22B can be exposed.

As shown in FIG. 2 and FIG. 3, at the downstream end of air flow flowing through the air duct W allowing air flow along the vehicle body transverse direction, the intake opening 30 of the intake pipe 31 of the air cleaner 24 is disposed. The intake pipe 31 extends through the rear partitioning wall 56A and is positioned upwardly of the core portion 22A of the radiator 22.

Other Embodiments

Next, other embodiments of the present invention will be explained. The following respective other embodiments can be implemented in a plurality of combinations to the foregoing embodiment as long as no conflicts occur therebetween. Incidentally, the scope of the present invention is not limited to the contents of these embodiments.

(1) In the foregoing embodiment the shutter mechanism 45 was disclosed as an example of the adjusting device B. However, the invention is not limited thereto.

Figure 9:
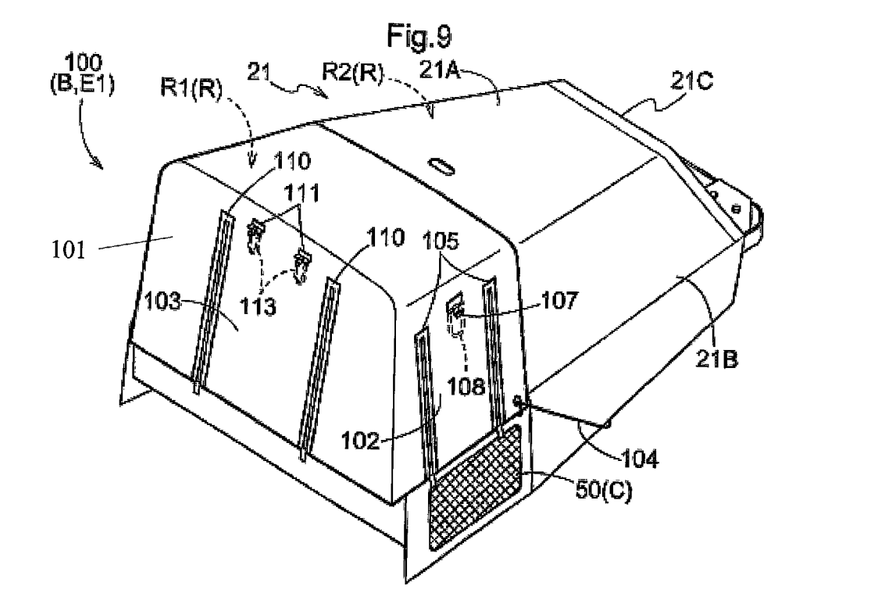
FIG. 9 is a perspective view of periphery of a cover mechanism in case the cover mechanism as the adjusting device is under a closed state.
Figure 10:
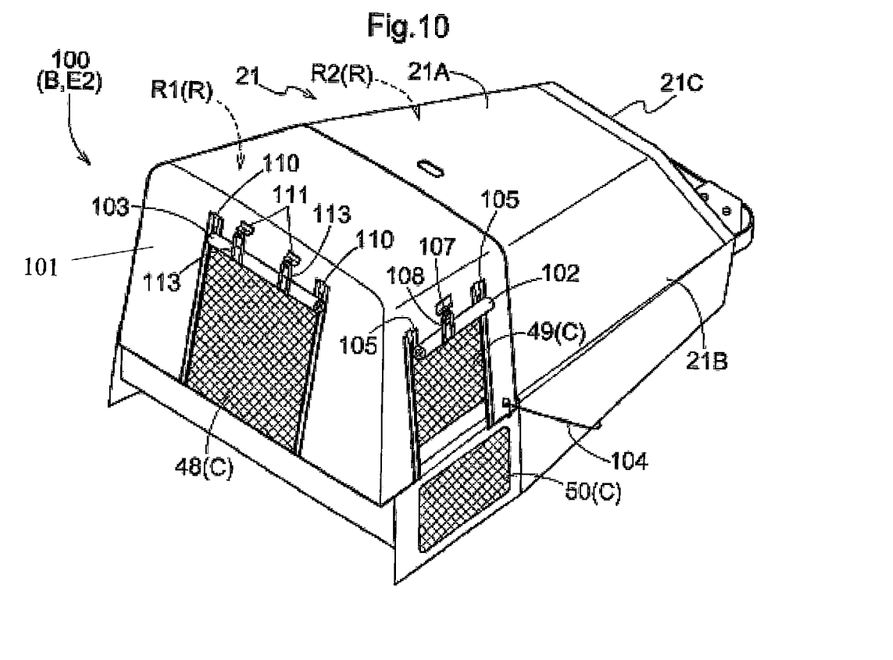
FIG. 10 is a perspective view of periphery of the cover mechanism in case the cover mechanism as the adjusting device is under an opened state.

For instance, as shown in FIG. 9 and FIG. 10, there can be provided a cover mechanism 100 for covering a portion of the hood 21 corresponding to the first region R1 and capable of changing an aperture ratio of the ventilation portion C. This cover mechanism 100 can be switched over between a closed state E1 (see FIG. 9) for reducing the amount of ambient air to flow into the first region R1 and an opened state E2 (see FIG. 10) for increasing the amount of ambient air to flow into the first region R1.

The cover mechanism 100 includes a cover body 101 covering the outer side of the hood 21 and having flexibility, lateral opening/closing covers 102 disposed on the right and left sides, a front opening/closing cover 103 disposed on the front side. The cover body 101 is configured to be capable of covering the front portion of the top plate portion 21A, the front and upper portions of the side plate portions 21B and the front portion of the hood 21. The front portion of the cover body 101 is held by the hood 21 via e.g. a string member 104.

Each of the right and left side opening/closing covers 102 is supported via a first fastener mechanism 105 to the cover body 101 to be openable and closable. The side opening/closing covers 102 can be retained to a first retaining body 107 made of metal and supported to the cover body 101. In the face of the side opening/closing cover 102 on the side of the engine room R, there is provided a first retained body 108 engageable to and disengeable from the first retaining body 107. The first retained body 108 is constituted of e.g. a loop-like rubber string having flexibility to be able to retain the side opening/closing cover 102 at a desired aperture ratio. Incidentally, the side opening/closing cover 102 may be provided with a magnet. With provision of such magnet, the side opening/closing cover 102 can be retained by means of magnetism of the magnet to the first retaining body 107 without fluttering.

The front opening/closing cover 103 is supported to the cover body 101 to be openable and closable, via a second fastener mechanism 110. To this front opening/closing cover 103, a second retaining body 111 made of metal and supported to the cover body 101 can be retained. In the face of the front opening/closing cover 103 on the side of the engine room R, there is provided a second retained body 113 engageable to and disengeable from the second retaining body 111. The second retained body 113 is constituted of e.g. a loop-like rubber string having flexibility to be able to retain the front opening/closing cover 103 at a desired aperture ratio. Incidentally, the front opening/closing cover 103 may be provided with a magnet. With provision of such magnet, the front opening/closing cover 103 can be retained by means of magnetism of the magnet to the second retaining body 111 without fluttering.

And, even when the right and left side opening/closing covers 102 and the front opening/closing cover 103 of the cover mechanism 100 are completely closed thereby to close the front ventilation portion 48 and the right and left upper lateral ventilation portions 49, the lower lateral ventilation portions 50 remain opened, so that ambient air can be introduced into the first region R1 of the engine room R from the outside via these lower lateral ventilation portions 50.

Incidentally, the cover mechanism 100 can be extended downwards to be able to cover the lower lateral ventilation portions 50 with the right and left side opening/closing covers 102. In this case, when the lower lateral ventilation portions 50 are completely closed by the right and left side opening/closing covers 102, the front ventilation portion 48, the right and left lateral ventilation portions 49 and the lower lateral ventilation portions 50 are closed, so that the aperture ratio of the ventilation portion C can be made zero.

(2) In the foregoing embodiment, as examples of the adjusting device B, the shutter mechanism 45 or the cover mechanism 100 was provided separately of each other. However, the invention is not limited thereto. As the adjusting device B, both the shutter mechanism 45 and the cover mechanism 100 can be provided at one time.

(3) In the foregoing embodiment, the shutter mechanism 45 as an example of the adjusting device B was disclosed to be position-fixed under the closed state D1 providing zero opening degree and the opened state D2 providing full opening degree. However, the invention is not limited thereto. For instance, the shutter mechanism 45 can be configured to be capable of stepwise opening-degree adjustment between the closed state D1 and the opened state D2.

(4) In the foregoing embodiment, the DPF 25 was disclosed as an example of the exhaust gas treating device. However, the invention is not limited thereto. For instance, an SCR (Selective Catalytic Reduction), a DOC (Diesel Oxidation Catalyst), etc. can be provided as the exhaust gas treating device.

(5) The present invention is applicable not only to the front-mount mower described above, but also to other work vehicles such as other riding grass mower such as a mid-mount mower or other work vehicles such as a civil engineering work machine, etc.

What is claimed is:

1. A work vehicle comprising:
   a hood that covers an engine room;
   a partition unit that divides the engine room into a first region and a second region, the engine room being configured such that air can be introduced from outside of the hood to the first region;
   a radiator disposed in the first region, air flowing through the radiator from the first region to the second region;
   an engine disposed in the second region;
   an accessory unit for the engine provided in the second region, the accessory unit including an air cleaner configured to feed dust-removed air to the engine;
   an adjusting device for adjusting an amount of the air that flows from the first region to the second region; and
   an air duct member disposed upwardly of the radiator,
   wherein the air duct member forms an air duct that allows air to flow through the air duct from the first region to the second region regardless of the amount of the air adjusted by the adjusting device, and an intake opening of the air cleaner is disposed on the air duct.

2. The work vehicle according to claim 1, further comprising:
   a fan for generating air current that flows from the first region toward the second region;
   wherein the adjusting device includes a shutter mechanism for varying amount of the air flowing from the first region to the second region by drive of the fan.

3. The work vehicle according to claim 2, wherein:
   the hood includes a ventilation portion at a portion thereof corresponding to the first region, the ventilation portion being configured to prevent introduction of dust into the hood from the outside thereof and to allow communication of air between the outside of the hood and the first region; and
   the adjusting device includes a cover mechanism configured to cover the portion of the hood corresponding to the first region and to vary an aperture ratio of the ventilation portion.

4. The work vehicle according to claim 1, wherein:
   the hood includes a ventilation portion at a portion thereof corresponding to the first region, the ventilation portion being configured to prevent introduction of dust into the hood from the outside thereof and to allow communication of air between the outside of the hood and the first region; and
   the adjusting device includes a cover mechanism configured to cover the portion of the hood corresponding to the first region and to vary an aperture ratio of the ventilation portion.

5. The work vehicle according to claim 1, wherein the accessory unit includes an exhaust gas treating device for effecting a cleaning treatment on exhaust gas from the engine.

* * * * *

UNITED STATES PATENT AND TRADEMARK OFFICE
CERTIFICATE OF CORRECTION

PATENT NO. : 9,676,270 B2
APPLICATION NO. : 15/164961
DATED : June 13, 2017
INVENTOR(S) : Hironori Tsuchihashi et al.

It is certified that error appears in the above-identified patent and that said Letters Patent is hereby corrected as shown below:

In the Claims

Column 10, Line 16, Claim 2, after "varying" insert -- the --

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*